United States Patent [19]

Samejima et al.

[11] Patent Number: 4,778,509
[45] Date of Patent: Oct. 18, 1988

[54] FURNACE FOR COOLING MOLTEN GLASS

[75] Inventors: Hiroshi Samejima; Akira Hoshino, both of Ichihara; Seiichiro Manabe, Itami, all of Japan

[73] Assignee: Nippo Sheet Glass Co., Ltd., Osaka, Japan

[21] Appl. No.: 135,565

[22] Filed: Dec. 23, 1987

Related U.S. Application Data

[60] Continuation of Ser. No. 892,868, Aug. 4, 1986, abandoned, which is a division of Ser. No. 751,255, Jul. 2, 1985, Pat. No. 4,652,293.

[30] Foreign Application Priority Data

Jul. 2, 1984 [JP] Japan .................. 59-137672

[51] Int. Cl.$^4$ .......................................... C03B 5/225
[52] U.S. Cl. ...................... 65/337; 65/137; 65/346; 65/347
[58] Field of Search ............... 65/137, 337, 346, 347

[56] References Cited

U.S. PATENT DOCUMENTS

| 1,893,061 | 1/1933 | Peiler | 65/337 |
| 2,735,229 | 2/1956 | Honiss | 432/238 X |
| 3,400,204 | 9/1968 | Gell | 65/337 |
| 3,645,712 | 2/1972 | Ihrig et al. | 65/347 X |
| 4,680,051 | 7/1987 | Blumenfeld et al. | 65/337 X |

FOREIGN PATENT DOCUMENTS 0133409  2/1985  European Pat. Off. .......... 65/337

Primary Examiner—Arthur Kellogg
Attorney, Agent, or Firm—Wenderoth, Lind & Ponack

[57] ABSTRACT

A furnace for cooling molten glass, which comprises a cooling tank for slowly cooling the molten glass while the average temperature of the molten glass is within a certain range extending below and above the temperature at which the speed of absorbing bubbles is highest, and cooling it rapidly when the average temperature of the molten glass is outside said range.

3 Claims, 3 Drawing Sheets

FURNACE FOR COOLING MOLTEN GLASS

This application is a continuation of now abandoned application Ser. No. 892,868 filed Aug. 4, 1986 which is a division of application Ser. No. 751,255 filed July 2, 1985 now U.S. Pat. No. 4,652,293.

This invention relates to a method of cooling molten glass, and to a glass melting furnace suitable for carrying out the cooling method.

Conventional glass furnaces have a considerably large cooling tank which is about one-half of the melting tank because they are adapted to spontaneously cool the molten glass mainly by the dissipation of heat from the outer surface of the cooling tank. The cooling time is therefore long, and much heat is dissipated wastefully from the surface of the cooling tank. Furthermore, these glass melting furnaces have not employed any structure which is intended for effective utilization of the heat dissipated from the cooling tank. Furthermore, the large size of the cooling tank adds to the cost of equipment, and also causes the inconvenience that much time is required for changing the composition of molten glass in the furnace.

It is an object of this invention to provide a method of cooling molten glass efficiently.

Another object of this invention is to provide a method of cooling molten glass which enables shortening of the cooling time.

Still another object of this invention is to provide a method of cooling molten glass, in which bubbles remaining in the molten glass can be effectively absorbed in the glass.

Yet another object of this invention is to provide a method of cooling molten glass which enables reutilization of dissipated heat.

A further object of this invention is to provide a method of cooling molten glass efficiently in which a cooling tank of a smaller size can be used.

An additional object of this ivvention is to provide a glass melting furnace equipped with a cooling tank suitable for the practice of the method of this invention.

Other objects and advantages of this invention will become apparent from the following description.

According to this invention, the above objects and advantages are achieved by a method of cooling molten glass, which comprises slowly cooling the molten glass while the average temperature of the molten glass is within a certain range extending below and above the temperature at which the speed of absorbing bubbles by the molten glass is highest, and cooling it rapidly when the average temperature of the molten glass is outside said range.

Figure 1:
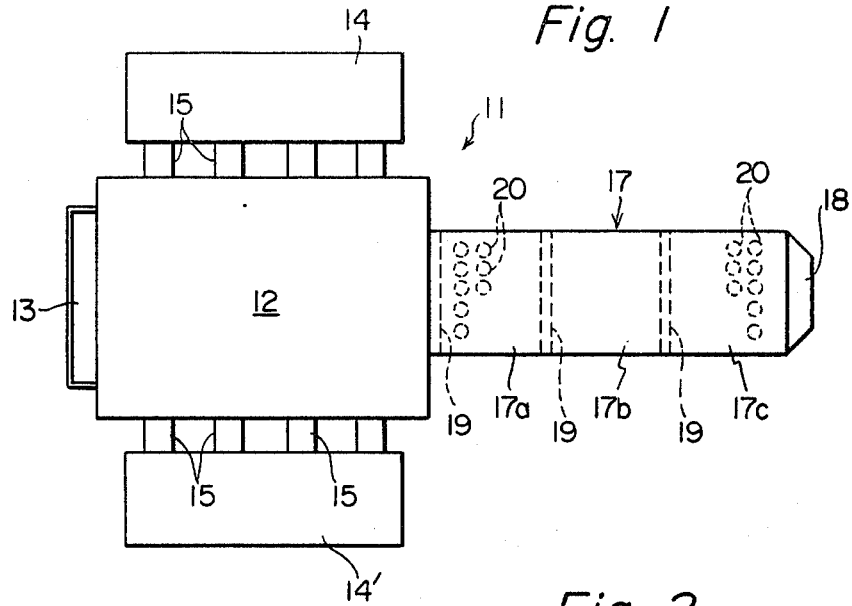
FIG. 1 is a top plan view of the glass melting furnace of this invention.

The method of this invention is based on the new discovery that the temperature at which the bubble absorbing speed of the molten glass is highest appears very distinctly although it varies depending upon the types of the glass composition and the type of gas in the bubbles. For example, the highest speed of absorbing $SO_3$ bubbles in soda lime silicate glasses is achieved at about 1390° C. With borosilicate glasses, the maximum speed of absorbing $SO_3$ bubbles is achieved at about 1400° C.

According to the method of this invention, the molten glass is slowly cooled when the average temperature of the molten glass is within a certain range extending below and above the temperature at which the speed of bubble absorption by the molten glass is highest, for example within a range of ±20° C. of the temperature at which the speed of bubble absorption is highest. As a result, the molten glass rapidly absorbs the bubbles. When the molten glass is at temperature outside the aforesaid range, it is rapidly cooled to expedite cooling.

Desirably, the slow cooling of the molten glass is carried out at a cooling rate of not more than about 2° C./min. The rapid cooling of the molten glass can be carried out at a cooling rate of at least about 3° C./min.

The method of this invention can be conveniently carried out by a glass melting furnace provided by this invention, which comprises a melting tank for melting a glass batch, a cooling tank located downstream of the melting tank for cooling the molten glass, and a drawing section located further downstream of the cooling tank for drawing the molten glass, wherein within the cooling tank, at least a first rapid cooling zone, a slow cooling zone and a second rapid cooling zone in which the cooling rates are different are provided in this sequence from the upstream side, the temperature of the molten glass is controlled so that it is within a range extending below and above the temperature at which the speed of bubble absorption is highest, and the molten glass is slowly cooled while its average temperature is within said range.

Accordingly, the method of this invention can be carried out, for example, by using a melting tank for melting a glass batch, a cooling tank located downstream of the melting tank for cooling the molten glass, and a drawing section located downstream of the cooling tank for drawing the molten glass. The method comprises providing within the cooling tank at least a first rapid cooling zone, a slow cooling zone and a second rapid cooling zone having different cooling rates in this sequence from the upstream side, controlling the temperature of the molten glass so that in the slow cooling zone, the temperature of the molten glass falls within the range extending below and above the temperature at which the speed of bubble absorption is highest, and slowly cooling the molten glass while its average temperature is within said range.

Preferably, in the slow cooling zone, the average temperature of the molten glass is controlled so as to fall within the range of ±20° C. of the temperature at which the speed of bubble absorption by the molten glass is highest, and the molten glass is slowly cooled while the average temperature of the molten glass is within this range. The molten glass is slowly cooled at a cooling rate of, for example, not more than 2° C./min. in the slow cooling zone. In the first and second rapid cooling zones, it is rapidly cooled at a cooling rate of, for example, at least 3° C./min.

One preferred embodiment of this invention will be described below with reference to the accompanying drawings.

Figure 2:
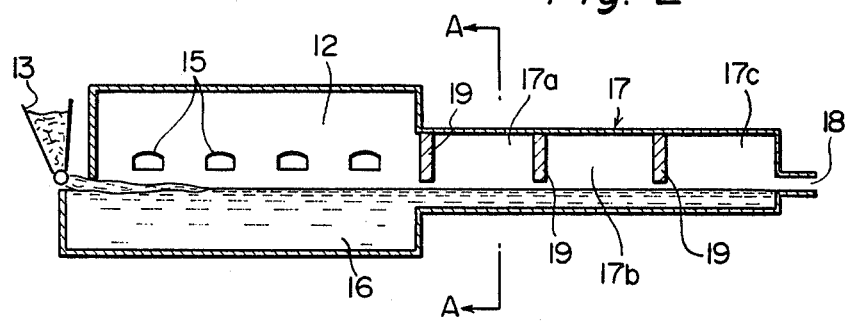
FIG. 2 is a vertical sectional view of the glass melting furnace of FIG. 1.
Figure 3:
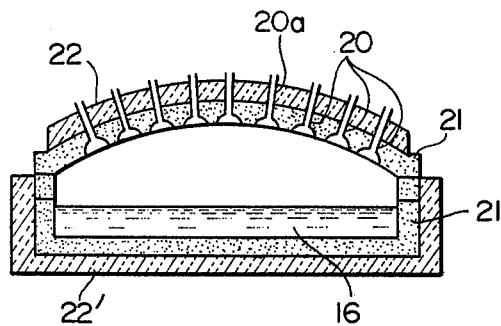
FIG. 3 is a sectional view taken along line A—A of FIG. 2.

FIGS. 1 to 3 show one embodiment of a glass melting furnace 11 in accordance with this invention. FIG. 1 is a top plan view, FIG. 2 is a vertical sectional view, and FIG. 3 is a sectional view taken along line A—A of FIG. 2.

The glass melting furnace 11 includes a melting tank 12 having a glass batch feeding opening 13. Regenerators 14 and 14' are provided on both sides of the melting tank 12, and each of the regenerators is connected to the melting tank by a plurality of blowoff openings 15. Flames generated by the burning of a heavy oil are directed to the glass batch through the blowoff openings 15. The glass batch is thus melted, and the molten glass 16 is accumulated in the melting tank. The molten glass is subjected to heat at a temperature of at least 1500° C. for more than 30 minutes, and flows into a cooling tank 17 while it is at a temperature of 1500° to 1550° C.

The cooling tank 17 is shorter in width by about 40 to 60% than the melting tank 12, and has a depth of about 0.2 to 0.4 m. Its overall size is smaller than that of a conventional cooling tank. The amount of the molten glass contained in it is 1/5 to 1/6 of that in the conventional cooling tank. The inner space of the cooling tank 17 is divided into three zones 17a, 17b and 17c. One end of the cooling tank 17 leads to the melting tank 12, and the other end forms a drawing port 18. A partition 19 is disposed between zones 17a, 17b and 17c.

The zones 17a and 17c are forced cooling zones, and the zone 17b is a spontaneous cooling zone. Accordingly, the molten glass is rapidly cooled in the zones 17a and 17c, and slowly cooled in the zone 17b. As forced cooling means for the zones 17a and 17c, a number of radiation cooling devices 20 are provided at the ceiling portion as shown in FIG. 3. Each of the radiation cooling devices 20 blows air into the cooling tank 17 through a hole 20a. This air makes the inner surface of the devices colder than the molten glass, and thus the molten glass 16 is cooled by radiation and conduction. As shown in FIG. 3, the cooling tank 17 is constructed by attaching thermally insulative members 22 and 22' to the surface of the entire structure formed of bricks 21 so as to insulate the outside surface of the cooling tank by the thermally insulative members 22 and 22' and minimize heat dissipation from the cooling tank.

The temperature of a molten soda lime silicate-type glass, for example, is preferably prescribed at its initial temperature to 1420° C. in the zone 17a, at 1420° to 1370° C. in the zone 17b, and at less than 1370° C. in the zone 17c. Preferably, the cooling rate is set at not less than 3° C./min. in the zone 17a, not more than 2° C./min. in the zone 17b, and at least 3° C./min. in the zone 17c.

Figure 4:
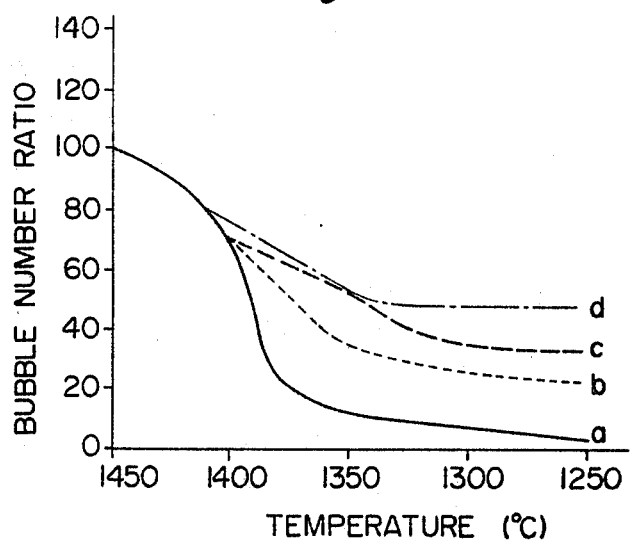
FIG. 4 is a characteristic diagram showing changes in the number of bubbles in the cooling step with the cooling speed being used as a parameter.
Figure 5:
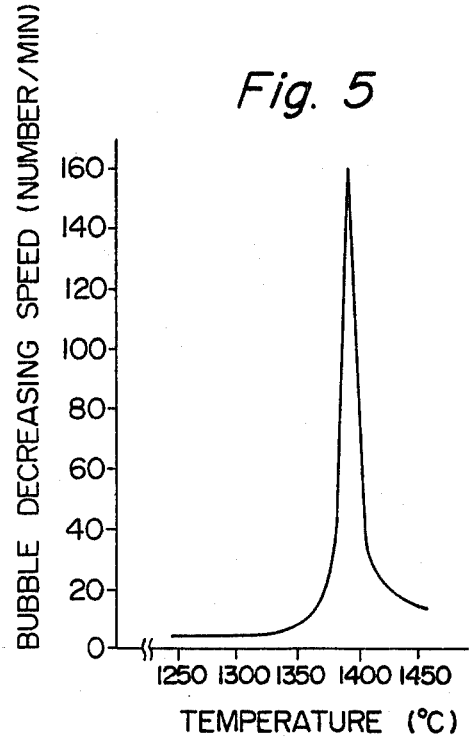
FIG. 5 is a characteristic diagram showing the relation between the temperature and the speed at which the bubbles decrease when the speed of slow cooling is 2° C./min.

The reasons for setting the temperature range and the slow cooling rate as above will be stated below with reference to FIGS. 4 and 5. FIG. 4 shows changes in the number of bubbles in the glass at different cooling rates, the ordinate showing the number of remaining bubbles by ratios. In FIG. 4, the cooling rate is 2° C./min. for curve a, 3° C./min. for curve b, 4° C./min. for curve c, and 6° C./min. for curve d. FIG. 5 shows the relation between the temperature and the speed at which the bubbles decrease. In FIG. 5, the slow cooling rate is 2° C./min. The glass used in obtaining these characteristics was of the soda lime silicate type and had the composition comprising 70.91% by weight of $SiO_2$, 1.69% by weight of $Al_2O_3$, 0.071% by weight of $Fe_2O_3$, 8.76% by weight of CaO, 3.92% by weight of MgO, 13.45% by weight of $Na_2O$, 0.82% by weight of $K_2O$, and 0.29% by weight of $SO_3$.

As is clear from FIGS. 4 and 5, the speed of bubble absorption becomes highest in a temperature range around 1390° C. If the molten glass is slowly cooled at a cooling rate of not more than 2° C./min. within this temperature range, the efficiency of decreasing the bubbles becomes highest, and the number of bubbles in the molten glass decreases abruptly. Thus, according to the process of bubble decreasing in the molten glass during cooling, it is possible to slowly cool the glass at a cooling rate of not more than 2° C./min. (preferably not more than 1° C./min.) only within the temperature range around 1390° C. thereby decreasing the bubbles most effectively, and to rapidly cool it by forced cooling at a rate of, for example, at least 3° C./min. at temperatures outside this range thereby accelerating cooling of the glass. The presence of a peak in bubble decreasing around 1390° C. is believed to be because the remaining bubbles are $SO_3$ bubbles and these bubbles rapidly dissolve in the molten glass at about 1390° C.

Since the cooling tank 17 is comprised of the first rapid cooling, slow cooling and second rapid cooling zones, it is no longer necessary to build it in a large size. In the zones 17a and 17c, the heat of the molten glass 16 is absorbed by the air blown into these zones by the radiation cooling devices 20, and the hot air can be taken out of the tank to utilize it effectively. The depth of the cooling tank 17 is small as shown hereinabove. The provision of the shallow cooling tank makes it possible to inhibit the backflow of the molten glass from the drawing side of the cooling tank to the melting tank side, and to adjust the temperature difference in the direction of the tank width. This can also obviate the use of energy required for re-heating of the cooled molten glass that has been caused to flow back.

The number of the zones in the cooling tank 17 may be more than three because the temperature of the absorption peak differs depending upon the type of the bubbles. The forced cooling means may also include water cooling performed by disposing a water-cooling tube within the molten glass. In this case, the partitions 19 are not necessary.

Figure 6:
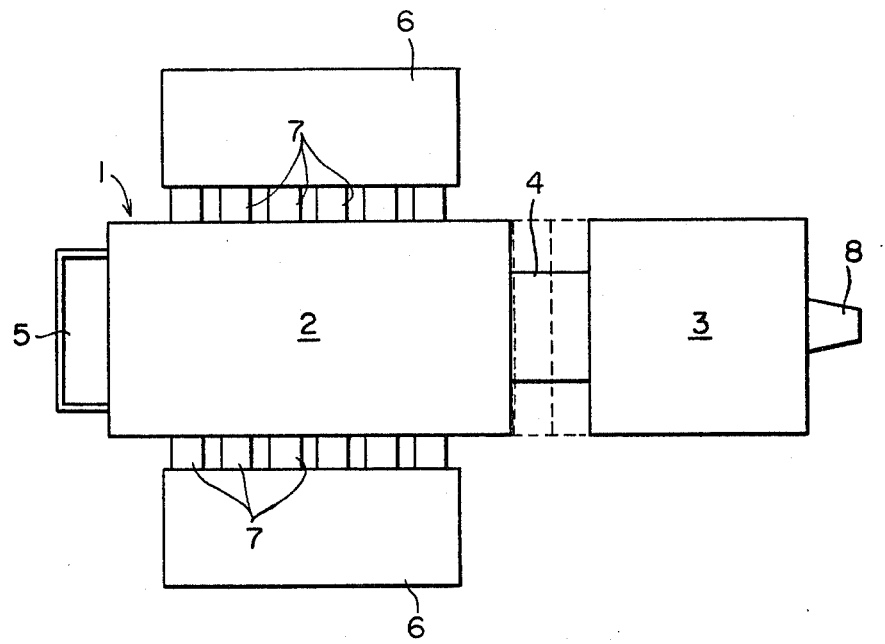
FIG. 6 is a top plan view of a conventional glass melting furnace.
Figure 7:
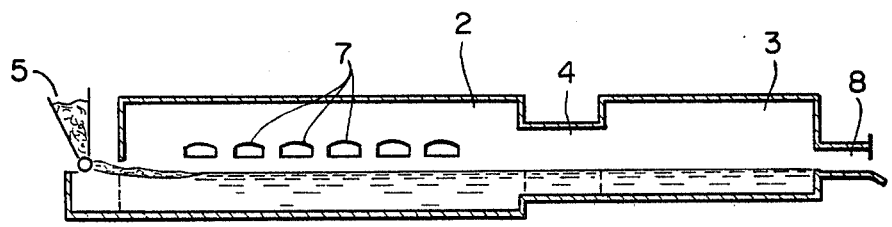
FIG. 7 is a vertical sectional view of the glass melting furnace of FIG. 6.

FIG. 6 shows a top plan view of a conventional continuous glass melting furnace for producing a sheet glass, and FIG. 7 shows its side elevation in vertical section. A glass melting furnace 1 has a melting tank 2 and a cooling tank 3, and a neck 4 is provided between the two tanks. A batch feeding opening 5 is formed at one end portion of the melting tank 2, and regenerators 6 are disposed on both sides of the tank 2, A glass batch is fed continuously from the feed opening 5. Flames generated by burning a heavy oil are directed through blowoff openings 7 on both side walls of the melting tank 2, and the inside of the melting tank 2 is kept at about 1600° C. At this temperature, the glass batch within the melting tank 2 is melted.

The glass which has been melted, homogenized and defoamed in the melting tank 2 flows out into the cooling tank 3 via the neck 4. In the cooling tank 3, the molten glass is cooled, and at the same time, fine bubbles remaining in the batch are dissolved and absorbed in the molten glass through the cooling process. This absorbing action decreases bubbles in the glass and increases the quality of the final product. The glass cooled in the cooling tank 3 is drawn from a drawing port 8.

As shown in the drawings, the cooling tank 3 is considerably large and measures about one-half of the melting tank 2 in the conventional glass melting furnace, and because of this, the conventional cooling tank has the defects described at the beginning of this specification.

As is clear from the foregoing description, according to the present invention, the molten glass is slowly cooled at a predetermined speed only when its temperature is within a specified range. It can be rapidly cooled outside this range. Hence, the cooling time can be shortened, and the cooling step can be controlled.

Since in the present invention, forced cooling zones are provided in cooling the molten glass, the entire cooling tank can be made small-sized and shallow. This structure permits a drastic reduction in the loss of energy and a reduction in the cost of installing the cooling tank.

The waste heat generated by the forced cooling means for the molten glass can be effectively utilized by taking it outside. Furthermore, since thermally insulative members are provided about the outer circumferential surface of the cooling tank, the loss of energy can be reduced further and the heat can be utilized effectively.

Since the cooling tank can be built in a small size, the amount of the molten glass contained in it can be decreased. Accordingly, the composition of the molten glass can be rapidly and easily changed, and the temperature distribution of the cooling tank can be easily preset. Thus, the glass melting furnace is easy to control.

The above embodiment is given with regard to $SO_3$ bubbles in the soda lime silicate glass. The present inventors have found that a peak of $SO_3$ bubble absorption is at about 1400° C. in the case of a borosilicate glass. It should be understood therefore that the temperature of a peak of bubble absorption naturally varies depending upon the composition of the glass and the kind of bubbles (for example, $O_2$ bubbles or $H_2O$ bubbles).

The cooling method of this invention can be applied not only to the continuous glass melting furnace, but also to other glass melting methods, for example to the melting of glass in a crucible.

What is claimed is:

1. In a glass melting furnace comprising a melting tank for melting a glass batch, a cooling tank downstream of said melting tank for cooling the molten glass, and a drawing section downstream of said cooling tank for drawing the cooled molten glass, the improvement wherein said cooling tank is shorter in width by about 40 to 60% than said melting tank, said cooling tank has a depth of about 0.2 to 0.4 m, and said cooling tank comprises:
   first upstream cooling means for rapidly cooling the molten glass at a rapid rate;
   second downstream cooling means for rapidly cooling the molten glass at a rapid rate;
   third cooling means between said first and second cooling means for cooling the molten glass at a rate of cooling less than the rates of cooling of said first and second cooling means;
   partition means between said first and third cooling means; and
   partition means between said second and third cooling means.

2. The glass melting furnace of claim 1 wherein said first and second cooling means each include a ceiling portion provided with radiation cooling devices.

3. The glass melting furnace of claim 1 wherein said cooling tank is formed of bricks, and thermal insulation members are attached to the outer surfaces of said cooling tank.

* * * * *